United States Patent [19]
Galafassi et al.

[11] 4,292,037
[45] Sep. 29, 1981

[54] PROCESS FOR DYEING CELLULOSE-CONTAINING FIBRE MATERIALS

[75] Inventors: Pierre Galafassi, Rixheim; Jean-Marie Adam, St. Louis, both of France; Peter Loew, Münchenstein; Hans Scheidegger, Binningen, both of Switzerland

[73] Assignee: Ciba-Geigy Corporation, Ardsley, N.Y.

[21] Appl. No.: 116,379

[22] Filed: Jan. 29, 1980

[30] Foreign Application Priority Data

Feb. 2, 1979 [CH] Switzerland ......................... 1043/79
Jun. 6, 1979 [CH] Switzerland ......................... 5268/79

[51] Int. Cl.³ ..................... C09B 67/00; C09B 44/00
[52] U.S. Cl. .......................................... 8/554; 8/654; 8/657; 8/658; 8/918; 8/919
[58] Field of Search ................... 8/554, 658, 657, 919, 8/918, 654

[56] References Cited

U.S. PATENT DOCUMENTS

| | | | |
|---|---|---|---|
| 2,016,504 | 10/1935 | Kranzlein et al. | 544/74 |
| 2,026,092 | 12/1935 | Kranzlein et al. | 544/74 |
| 2,082,344 | 6/1937 | Kranzlein et al. | 544/74 |
| 3,438,964 | 4/1969 | Dien | 8/654 |
| 3,933,787 | 1/1976 | Moser | 8/7 |
| 3,981,679 | 9/1976 | Christie et al. | 8/169 |

FOREIGN PATENT DOCUMENTS

| | | |
|---|---|---|
| 868001 | 12/1978 | Belgium . |
| 2604910 | 8/1976 | Fed. Rep. of Germany . |
| 1495232 | 9/1967 | France . |
| 2311888 | 12/1976 | France . |
| 528577 | 11/1972 | Switzerland . |
| 1006892 | 10/1965 | United Kingdom . |
| 1338250 | 11/1973 | United Kingdom . |

Primary Examiner—A. Lionel Clingman
Attorney, Agent, or Firm—Edward McC. Roberts

[57] ABSTRACT

There is described a process for dyeing paper or, in particular, cellulose containing fibre material with an aqueous dye liquor, which dye liquor contains at least one cationic or basic dye which (a) has available at least one system of delocalized π-electrons, which system consists of at least 9 conjugated double bonds lying in one plane, and (b) possesses a planar molecular structure, the said material being treated, before or during dyeing, with at least one cationic or basic levelling agent; there is no necessity to add salt additionally to the dye bath, and there are obtained by this process level dyeings which exhibit a high degree of exhaustion of the dye, and which are characterized by good fastness properties, especially by good fastness to wet processing.

44 Claims, No Drawings

PROCESS FOR DYEING CELLULOSE-CONTAINING FIBRE MATERIALS

The invention relates to a process for dyeing cellulose-containing fibre materials with specific cationic dyes without separate addition of salt, and without pretreatment or aftertreatment of the fibres with tannin or potassium antimonyltartrate or with similar products; to a dye liquor or pretreatment liquor; as well as to the cellulose containing fibre material dyed by the process.

The method of dyeing cellulose-containing fibre materials with cationic dyes using the exhaust process is known, whereby these materials are pretreated with for example tannin to attain an adequate build-up of the dye, and optionally aftertreated with for example potassium antimonyltartrate to obtain a suitable fastness to wet processing.

Further cationic dyes of which the somewhat higher standard affinity for cellulose materials would permit an application without tannin/potassium antimonyltartrate were not of any practical use on account of unsatisfactory levelness, particularly in the case of light and medium shades. The standard affinity of these known dyes is as a rule too low, so that deep shades are unobtainable.

Also known is the dyeing of cellulose-containing fibre materials with temporary or permanent anionic dyes, for example with conventional, optionally aftercoppered, direct dyes, sulfur dyes and reactive dyes, in the exhaust process. These dyes however require the addition of large amounts of electrolytes, such as sodium sulfate, to the dye bath in order to ensure a sufficient build-up of the dyes.

The dyeings with the anionic dyes have on cellulose-containing textile materials only very limited fastness to washing, unless the dyeings have been fixed by a subsequent rendering of them insoluble, by enlargement of the adsorbed dye molecule or by covalent bonding.

These known processes have, inter alia, the disadvantages that on the one hand—in the case of cationic dyes—ecologically questionable and time-consuming and, from an energy standpoint, costly pre- and aftertreatments are necessary, the dyeings having moreover only a very slight fastness to light and to wet processing, or being very uneven and very limited with regard to depth of shade or colour, and that on the other hand, in the case of anionic dyes, the addition of large amounts of salt greatly contaminate the waste liquor. Furthermore, there are used, depending on the type of dye, undesirable substances from an ecological and toxicological point of view, such as copper ions, sodium sulfides, chromium-containing reducing agents, and so forth, for rendering the dyes insoluble or for bonding them on the fibres.

It was therefore the object of the present invention to provide a dyeing process, particularly for cellulose-containing fibre materials and also for paper, in which the described disadvantages are eliminated.

It has been found that, surprisingly, by application of a novel process in which cationic or basic dyes are used, that is to say, dyes protonisable under the application conditions, there are obtained on the said materials, with use of the levelling agents of the type given in the following, without pretreatment and/or aftertreatment of the fibres with tannin/potassium antimonyltartrate, and without separate addition of salt to the dye bath, dyeings which are characterised by a surprisingly good levelness of light to dark shades, by a very good dye build-up, by a high degree of exhaustion of the dyes, and by very good reproducibility of the dyeings, the dyeings exhibiting a surprisingly good fastness to wet processing, which in some cases equals that of a dyeing obtained with vat dyes or reactive dyes, without a rendering of the dyes insoluble or a covalent bonding of the dyes to the substrate being necessary.

The process according to the invention for dyeing cellulose-containing fibre materials and paper comprises adding to an aqueous dye liquor at least one cationic or basic dye which (a) has available at least one system of delocalised $\pi$-electrons which consists of at least 9 conjugated double bonds lying in one plane, (b) possesses a planar molecular structure (in the sense of a direct-dye structure, see for example the following publications: Th. Vickerstaff, "The Physical Chemistry of Dyeing," 2nd Ed. 1954, Oliver/Boyd, pages 172–190; or E. H. Daruwalla, S. S. Rao, B. D. Tilak, "Relation between Coplanarity and Substantivity of Quinoids Dyes applied to Cellulose Acetate and Cellulosic Fibres," JSDC 76, 1960, 418–424; or A. Schaeffer, "Warum sind substantive Farbstoffe substantiv?" (Why are substantive Dyes substantive?), Melliand Textilberichte 39 (1958), 1, 68–74; 2, 182–186; 3, 289–292; or J. Boulton, "The Dyeing of Cellulose: Theory and the Dyer," Textile Research Journal, 12, 1958, 1022–1030; or W. L. Lead, "Cellulose Substantivity," JSDC 75, 1959, April, 195–196), and has a molecular structure as linear as possible, the material being treated, before or during the dyeing thereof, with at least one cationic or basic levelling agent.

The cationic or basic dyes usable according to the invention can also contain anionic groups, for example sulfonic acid groups, phosphoric acid groups or carboxylic acid groups, with the proviso that the number of cationic or basic groups in the dye molecule is not smaller than the number of anionic groups.

There are advantageously used according to the invention such dyes which contain at least 12 double bonds uninterruptedly conjugated and lying in one plane, and which advantageously contain 1 to 8, particularly 1 to 3, cationic or basic groups.

Suitable cationic groups are for example groups of the following formulae (Ia) to (Ij):

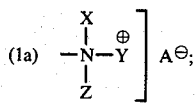

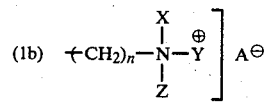

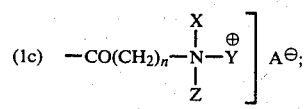

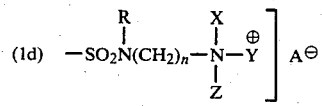

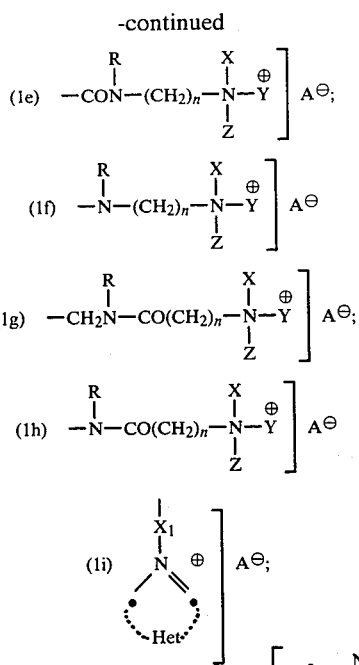

(1e) $-\overset{R}{\underset{|}{CON}}-(CH_2)_n-\overset{X}{\underset{|}{\overset{|}{\underset{Z}{N}}}}\overset{\oplus}{-}Y \quad A^{\ominus};$ (1f) $-\overset{R}{\underset{|}{N}}-(CH_2)_n-\overset{X}{\underset{|}{\overset{|}{\underset{Z}{N}}}}\overset{\oplus}{-}Y \quad A^{\ominus}$ (1g) $-CH_2\overset{R}{\underset{|}{N}}-CO(CH_2)_n-\overset{X}{\underset{|}{\overset{|}{\underset{Z}{N}}}}\overset{\oplus}{-}Y \quad A^{\ominus};$ (1h) $-\overset{R}{\underset{|}{N}}-CO(CH_2)_n-\overset{X}{\underset{|}{\overset{|}{\underset{Z}{N}}}}\overset{\oplus}{-}Y \quad A^{\ominus}$ (1i) 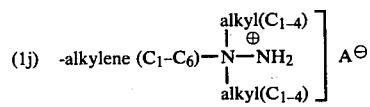

(1j) -alkylene $(C_1-C_6)-\overset{alkyl(C_{1-4})}{\underset{alkyl(C_{1-4})}{\overset{|}{\underset{|}{N}}}}{\overset{\oplus}{-}}NH_2 \quad A^{\ominus}$ wherein $X_1$ is an alkylene bridge ($C_1$–$C_6$) or an arylene bridge (for example p-phenylene), X, Y, R and Z are each an alkyl group which is unsubstituted or is substituted for example by hydroxyl or amino, such as the methyl, ethyl, propyl or butyl group, or an aryl group, such as the phenyl group, or an alkylaryl group, or a hydrogen atom, and X and Y and/or Z together with the N atom can also form a heterocycle such as the pyridinium ring, n denotes the numbers 1 to 6 inclusive, and $A^{\ominus}$ is an anion.

The basic or cationic groups can be isolated from the π-electron system of the chromophore, or can be contained in the chromphoric system.

The basic or cationic groups can be permanent or temporary. The splitting-off of the cationic group in the case of a temporary group can optionally lead to a covalent bond between the dye molecule and the substrate, for example the OH groups of the cellulose. The dyes can moreover contain nonionic or temporarily anionic fibre-reactive groups.

The proviso is that the cationic or basic dyes usable according to the invention have a direct-dye structure; they must have available a system of delocalised π-electrons which is as extended as possible, and which consists of at least 9, advantageously 12, double bonds uninterruptedly conjugated and lying in one plane. In preferred configurations, the π-electron system extends over the whole chromophore; it is however also possible that the chromophore contains several such π-electron systems which are joined together by way of bridges, for example by way of an —NHCONH—, —NHCO—, —SO₂— or triazinyl bridge. Preferred positions of these bridges are those which favourably influence the linearity and planarity of the dye molecules. The chromophores can belong to the widest variety of chemical classes; they are for example: azo, azostilbene, stilbene, azamethine, styryl, xanthene, azine, oxazine, thiazine, dioxazine, benzanthrone, anthraquinone and perinone dyes. The chromophoric systems can also contain metal atoms in the complexed form, such as Cu, Ni, Co or Cr, for example in the case of phthalocyanine and formazan dyes.

It is also possible to use 2 or 3 or more of the defined dyes together, and these can give identical shades or shades differing from one another.

Furthermore, it is advantageous when the molecular weight of the dyes usable according to the invention is greater than 600, particularly greater than 800.

The cationic or basic dyes usable according to the invention are for example dyes of the following constitutions:

(A) Azo compounds of the formula

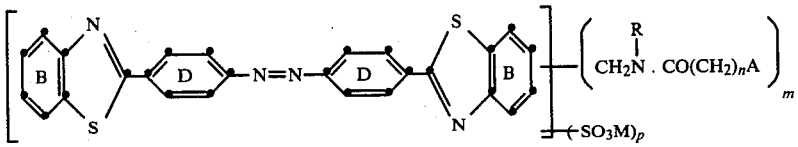

wherein R is hydrogen or an alkyl group having 1 to 4 C atoms; A is an optionally quaternised basic radical; n denotes the numbers 1 to 4 inclusive; m denotes the range of numbers from 1 to 4 inclusive; M is hydrogen or any chosen cation; and p denotes the numbers 0 to 2 inclusive, with the proviso that m is equally great or greater than p; and wherein the benzene groups B and D can be identically or differently further mono- or polysubstituted. These dyes can be produced for example (a₁) by introducing, once to four times, into an azo compound of the formula

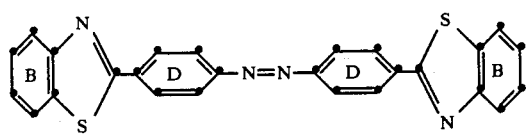

wherein the symbols B and D have the given meanings, the group

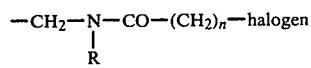

wherein R and n have the given meanings; subsequently replacing the halogen atom with a basic group A or a quaternised basic group A⊕] X⊖, wherein X⊖ is any chosen anion; and optionally converting the basic group, by quaternisation, into a quaternised basic group, and then optionally introducing an SO₃M group; or (a₂) by introducing, once to four times, into an azo compound of the formula

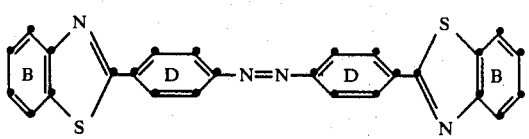

the group

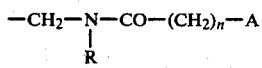

wherein A is a basic group, and R and n have the given meanings; and subsequently optionally quaternising the basic group A, and then optionally introducing an SO₃M group.

(B) Dioxazine compounds of the formula

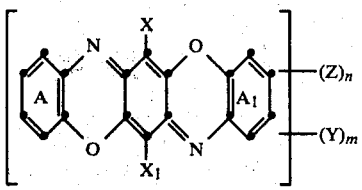

wherein Z is an optionally quaternised basic group; Y is an anionic group; X and $X_1$ independently of one another are identical or different substituents from the class: hydrogen, halogen, CN, substituted or unsubstituted alkyl ($C_1$-$C_4$); substituted or unsubstituted phenyl; NHCOR₁, wherein R₁ is alkyl ($C_1$-$C_4$), cycloalkyl, substituted or unsubstituted aryl, or an heterocyclic radical; OCOR₂, wherein R₂ is substituted or unsubstituted alkyl ($C_1$-$C_4$) or cycloalkyl; or

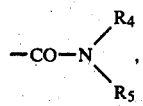

wherein R₄ and R₅ independently of one another are: hydrogen, substituted or unsubstituted alkyl ($C_1$-$C_4$), cycloalkyl or aryl, or R₄ together with R₅ and including the N atom forms a heterocyclic ring, or X and $X_1$ are the group COOR₆, wherein R₆ is hydrogen, substituted or unsubstituted alkyl or cycloalkyl; n denotes the range of numbers from 1 to 4 inclusive; m denotes the numbers 0 to 2, with the proviso that the number m is smaller than n, and wherein the benzene groups A and A₁ can be identically or differently further mono- or polysubstituted. These dyes can be produced (b₁) by introducing into a compound of the formula

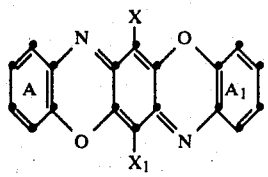

wherein the symbols A, A₁, X and X₁ have the given meanings, an optionally quaternisable basic group Z; then optionally introducing, if Y is still not present, an anionic group Y; and optionally quaternising the quaternisable basic group Z with a quaternising agent; or (b₂) by condensing a compound of the formula

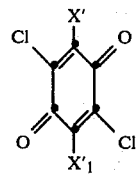

wherein X′ and $X_1'$ have the same meanings as X and X₁, but are not CN, with at least a mols of a compound A—NH₂ and b mols of a compound A₁—NH₂, the sum of a and b being at least 2, which compounds A—NH₂ and A₁—NH₂ contain n times an optionally quaternisable basic group Z or an already quaternised basic group Z, with ring closure to give a dioxazine compound; quaternising an optionally present quaternisable basic group Z with a quaternising agent; and optionally introducing an anionic group Y; or by condensing the compound of the formula

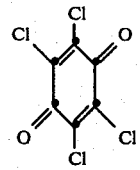

with a mols of A-NH₂ and b mols of A₁-NH₂, with ring closure, according to the data given above; and subsequently replacing the two Cl atoms with CN atoms.

(C) Dioxazine compounds of the formula

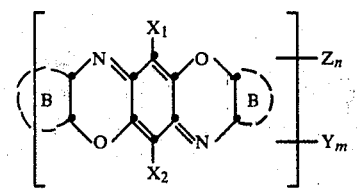

wherein X₁ and X₂ independently of one another are each a straight-chain or branched-chain alkyl group having 1 to 4 carbon atoms, a substituted or unsubstituted phenyl group, halogen, hydrogen, cyano, a phenylamino group which can be substituted in the phenyl group, or they are each the CONH₂ group, the CONH phenyl group which can be substituted in the phenyl group, or they are each a COO-alkyl($C_1$-$C_4$) group; Z is an optionally quaternised basic group; Y is an anionic group; the B's independently of one another are each a fused-on ring system having 2 to 4 carbocyclic and/or heterocyclic rings, which system can be further substituted, in addition to the substituents Z and Y; n denotes the range of numbers from 1 to 4 inclusive, and m the range of numbers from 0 to 2 inclusive, with the proviso that m is not greater than n. These dyes can be produced (c₁) by introducing into a compound of the formula

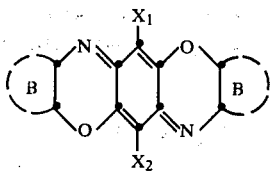

wherein the B's can be identical or different, and $X_1$ and $X_2$ are as defined in the foregoing, which compound can optionally contain the radical Y, an optionally quaternisable basic group Z, or a radical containing such a group Z; then optionally introducing, if Y is still not present, a water-solubilising group Y; and optionally quaternising the quaternisable basic group Z with a quaternising agent; or (c₂) by condensing a compound of the formula

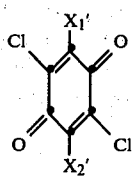

wherein $X_1'$ and $X_2'$ have the same meanings as $X_1$ and $X_2$, except they are not CN, with at least a mols of a compound B—NH₂ and b mols of a compound B'—NH₂, where the sum of a and b is at least 2, and where B and B' are identical or different, which compounds contain an optionally quaternisable basic group Z or an already quaternised basic group Z, with ring closure, to give a dioxazine compound; quaternising an optionally present quaternisable basic group Z with a quaternising agent; and optionally introducing the water-solubilising group Y; or, if $X_1$ and $X_2$ in the final product of formula I are CN, by condensing a compound of the formula

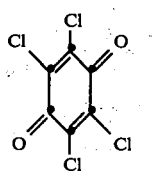

with a mols and b mols of B—NH₂ and B'—NH₂, respectively, with ring closure; and subsequently exchanging the two Cl atoms at the position of $X_1$ and $X_2$ for CN.

The cellulose materials are treated according to the invention, before or during dyeing, with at least one cationic or basic levelling agent, and basic levelling agents are to be understood as being levelling agents which are protonisable under application conditions. Suitable levelling agents of this type are in particular polymeric compounds which have sufficient affinity for the cellulose, and which contain for example at least one amino group or an ammonium group, such as those of the following formulae (2a) to (2d):

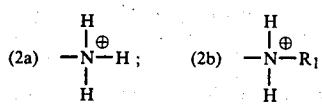

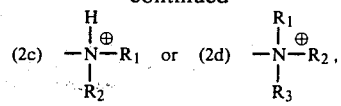

or at least one sulfonium group, such as one of the formula:

or at least one phosphonium group, such as one of the formula:

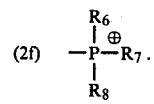

The levelling agents containing ammonium groups are preferred to the levelling agents containing sulfonium or phosphonium groups. $R_1$, $R_2$ and $R_3$ in the formulae (2a) to (2d) are in each case substituted or unsubstituted alkyl, cycloalkyl or alkenyl having at most 20 carbon atoms, aryl or aralkyl. In a less preferred embodiment, $R_1$, $R_2$ and $R_3$ are alkyl which has 1 to 8 carbon atoms and which is unsubstituted or substituted by phenyl; or $R_1$ and $R_2$ together with the nitrogen atom to which they are bound can also form a substituted or unsubstituted heterocyclic ring having 5 or 6 ring members, for example a morpholine ring. $R_4$ to $R_8$ in the formulae (2e) and (2f) are alkyl which has 1 to 8 carbon atoms and which can be substituted by phenyl.

Polymers containing ammonium groups, in which polymers $R_1$ to $R_3$ in the ammonium groups of the formulae (2a) to (2d) are alkyl which has 1 to 8 carbon atoms and which is unsubstituted or substituted by phenyl, or in which $R_1$ and $R_2$ or $R_2$ and $R_3$ together with the nitrogen atom to which they are bound form a morpholine group, are derived for example from polyacryloxyalkyl, polymethacryloxyalkyl, polyacrylamidoalkyl, polymethacrylamidoalkyl, polyalkenyl, polyvinyloxy, polyvinylbenzyl, polydiallyl, polyvinylpyridinium and polyvinylimidazoline compounds, whilst polymers containing sulfonium groups are derived for example from polyacryl, polyvinylbenzyl and polydiallyl compounds; and polymers containing phosphonium groups are derived from polyvinyl, polyacryl and polyvinylbenzyl compounds.

The polymers which are derived from the compounds mentioned in the foregoing are known for example from J. Macromol. Sci. Chem. A 4 (6) 10, 1970, pp. 1327–1417, M. F. Hoover, and can be produced by known methods.

Besides these known polymers, suitable levelling agents in a preferred embodiment of the process according to the invention are those which contain a copolymer formed from maleic anhydride and ethylene or styrene, which is reacted with an n-alkylamine having 2 or 3 carbon atoms, which is substituted in the terminal position on the alkyl group by alkylamino having 1 to 4 carbon atoms, or by a cyclic amine which contains 5 or 6 ring carbon atoms and optionally 1 oxygen atom; or contains a homopolymer of a vinylpyridine which is unsubstituted or substituted by methyl or ethyl; the homo- or copolymer being quaternised with a halomethylnaphthalene or -diphenyl, with chloroacetamide or chloroacetonitrile, or with a benzyl halide which is unsubstituted or substituted by halogen, methyl or ethyl, and optionally with an alkyl or alkenyl halide having at most 4 carbon atoms.

These homo- or copolymers contain cationic recurring units which correspond to the formula

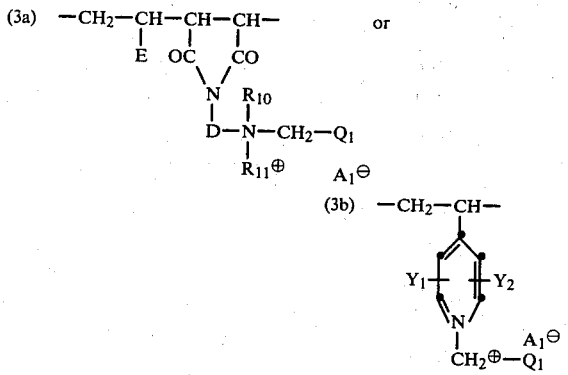

wherein $Q_1$ is a substituent of any one of the formulae

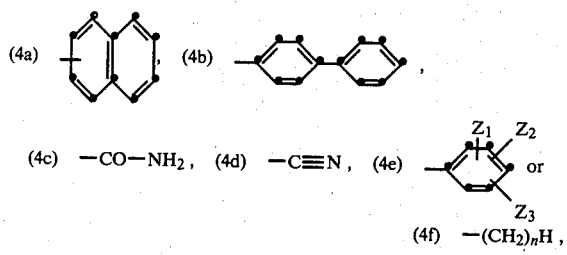

wherein n is 5–19 inclusive, or a mixture of at least one substituent of one of the formulae (4a) to (4e) with alkyl or alkenyl having at most 4 carbon atoms; and D is ethylene or n-propylene; E is hydrogen, methyl or phenyl; $R_{10}$ and $R_{11}$ are each methyl, ethyl, n-propyl or n-butyl, or together with the nitrogen atom to which they are bound they form a pyrrolidine, piperidine or morpholine group; $A_1$ is halogen; $Y_1$ and $Y_2$ are each hydrogen, methyl or ethyl; and $Z_1$, $Z_2$ and $Z_3$ are each hydrogen, halogen, methyl or ethyl.

Further preferred levelling agents contain cationic recurring units of the formula

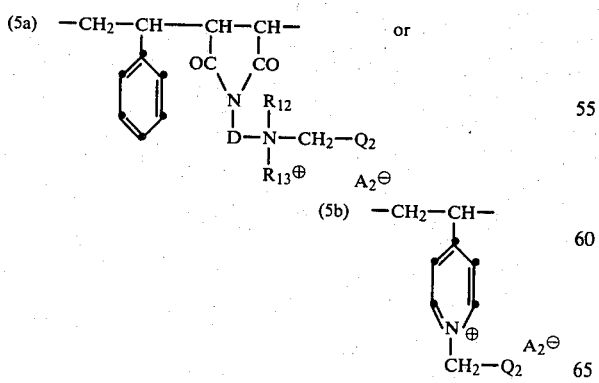

wherein $Q_2$ is —CN, —$CH_2$—CO—$NH_2$ or phenyl; D is ethylene or n-propylene; $A_2$ is chlorine or bromine; $R_{12}$ and $R_{13}$ are each methyl, ethyl or n-propyl, or together with the nitrogen atom to which they are bound they form a morpholine group; and particularly cationic recurring units of the formula

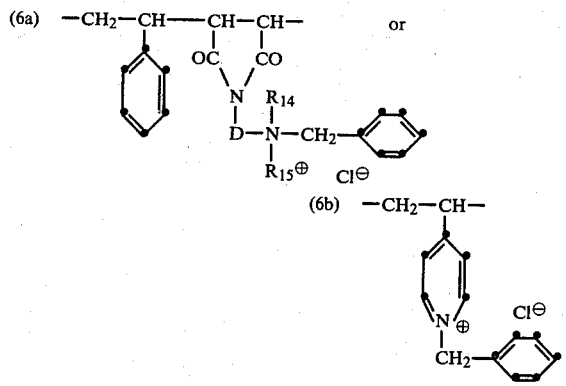

wherein D is ethylene or n-propylene; and $R_{14}$ and $R_{15}$ are each methyl or ethyl.

Particularly preferred levelling agents are those which contain specific cationic recurring units of the formula

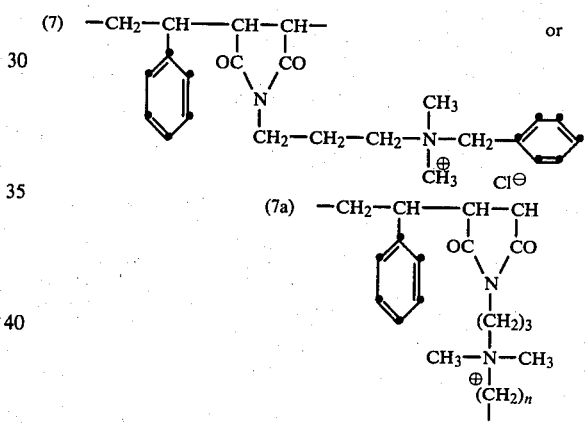

n = 6–20, preferably 12

Further levelling agents which are also preferred contain specific cationic recurring units of any one of the formulae:

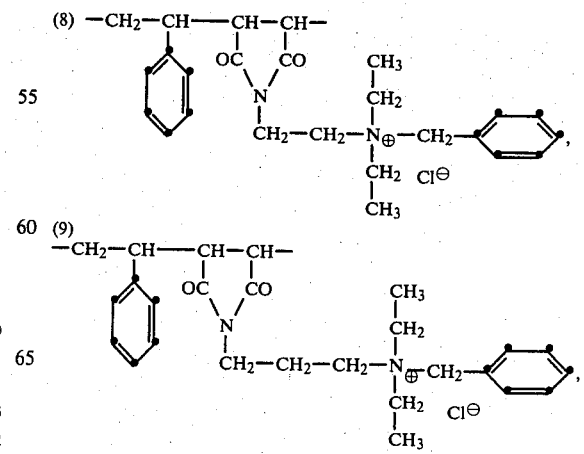

(10) 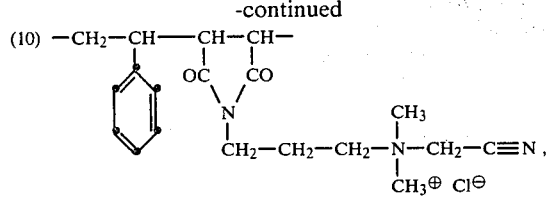

(11) 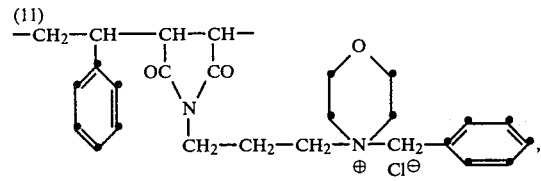

(12) 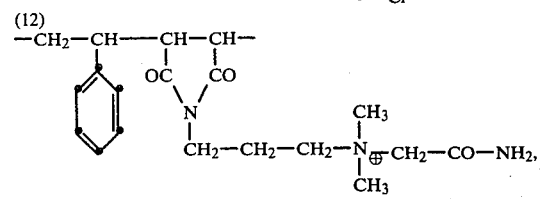

(13) 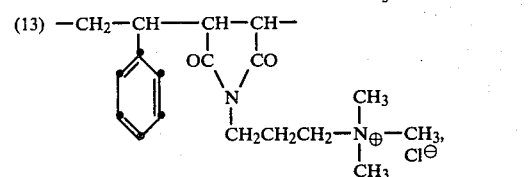

or

(14) 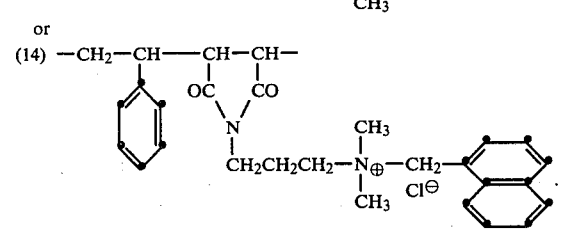

The average molecular weight of the levelling agents used according to the invention, which contain recurring units of the formula (3a) or (3b), is as a rule 1500 to 1,000,000. Accordingly, the levelling agents contain in general 4 to 2200 recurring units of the formula (3a) or (3b), and particularly 1800 to 2200 recurring units of the formula (3b), or 7 to 36 recurring units of any one of the formulae (7) to (14).

These levelling agents are known per se, and are produced by known methods. They are described for example in the German Offenlegungsschrift No. 2,604,910 and in the British patent specification No. 855,028.

Especially preferred levelling agents usable according to the invention are also polymeric quaternary ammonium salts of which the cationic recurring units correspond to the formula

(15) 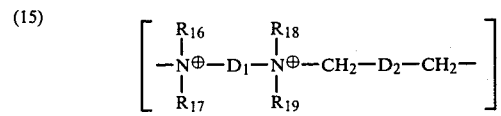

wherein $R_{16}$, $R_{17}$, $R_{18}$ and $R_{19}$ are identical to or different from one another, and are substituted or unsubstituted alkyl, cycloalkyl or alkenyl having at most 20 carbon atoms, aryl or aralkyl; or ($R_{16}$ and $R_{17}$) and/or ($R_{18}$ and $R_{19}$) together with the nitrogen atom to which they are bound form a substituted or unsubstituted heterocyclic ring having 5 or 6 ring members; $D_1$ is $-(CH_2)_m-$, wherein m is a number from 1 to 20 inclusive, which groups can be interrupted by at least one $$-S-, \quad -\overset{O}{\underset{\|}{C}}- \quad \text{or} \quad -CH=CH- \quad \text{grouping,}$$

or substituted by at least one hydroxyl, halogen, nitrile, alkyl, hydroxyalkyl, alkoxy, carboxyl or carbalkoxy group, or can be substituted by at least one substituted aryl or aralkyl group; or $D_1$ is polyoxyalkylene; or a radical of any one of the formulae (16a) 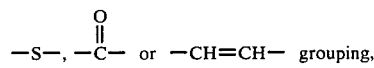

(16b) 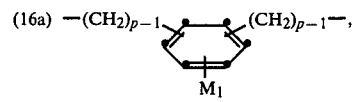, (16c)

(16d) 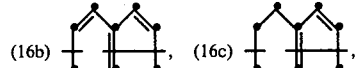

(16e) 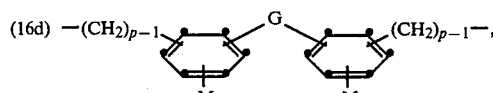, (16f) 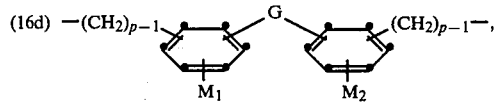

(16g) 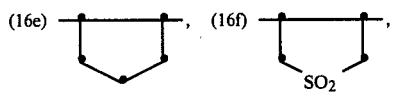, (16h) 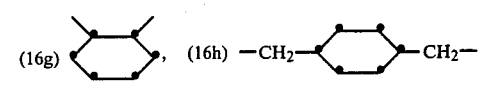

or (16i) 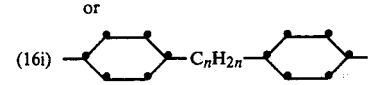

or together with the nitrogen atom and at least one of the substituents bound to the nitrogen atoms it forms a radical of the formula (17a) 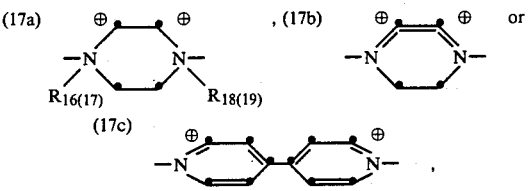 , (17b)  or (17c) 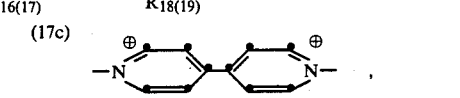

in which formulae $M_1$ and $M_2$ are each hydrogen, alkyl, hydroxy- or haloalkyl having 1 to 4 carbon atoms, hydroxyl, halogen, carboxyl, carbalkoxy or phenyl; G is the direct bond,

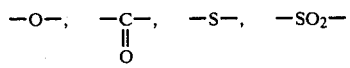

or substituted or unsubstituted alkylene; n is a number from 1 to 6 inclusive; p is a number from 1 to 3 inclusive, preferably 1 or 2; and $D_2$ is a radical of the formula (18a)  or. (18b)

Particularly suitable polymeric quaternary ammonium salts contain the cationic recurring units of the formula

(19) 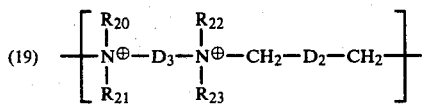

wherein $R_{20}$, $R_{21}$, $R_{22}$ and $R_{23}$ are identical to or different from one another, and are cycloalkyl having 5 or 6 carbon atoms; alkyl, hydroxyalkyl, cyanoalkyl, alkoxyalkyl, alkylthioalkyl and alkylcarbonylalkyl having 1 to 10 carbon atoms; arylcarbonylalkyl, alkylsulfonylalkyl and arylsulfonylalkyl having 1 to 4 carbon atoms in each alkyl part; carboxyalkyl having 1 to 4 carbon atoms in the alkyl part; carbalkoxyalkyl and di-(carbalkoxy)-alkyl having 1 to 4 carbon atoms in each alkoxy and alkyl part; carboxylic acid amidoalkyl which has 1 to 10 carbon atoms in the alkyl part and which can be N-substituted with lower alkyl or aryl; or they are phenyl or benzyl which can be substituted by hydroxyl, cyano, halogen and carboxyl; or they are alkyl, hydroxyalkyl, cyanoalkyl, alkoxy and alkylthio having 1 to 4 carbon atoms; alkoxyalkyl, carbalkoxyalkyl and di-(carbalkoxy)alkyl having in each alkyl and alkoxy part 1 to 4 carbon atoms; or ($R_{20}$ and $R_{21}$) and/or ($R_{22}$ and $R_{23}$) together with the nitrogen atom to which they are bound form a substituted or unsubstituted heterocyclic ring having 5 or 6 ring members; $D_3$ is $-(CH_2)_m-$, wherein m is a number from 1 to 20 inclusive, which groups can be interrupted by at least one $-S-$, $-\underset{\underset{O}{\|}}{C}-$ or $-CH=CH-$ grouping, or can be substituted by at least one hydroxyl, chlorine, nitrile or alkyl, alkoxy or hydroxyalkyl having 1 to 4 carbon atoms, carboxyl or carbalkoxy having 1 to 20, preferably 1 to 4, carbon atoms in the alkoxy part, or substituted or unsubstituted phenyl or benzyl groups; or $D_3$ is a radical of the formula

(20) 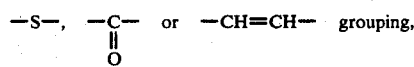

wherein T is hydrogen or methyl; and x is at least 1; or $D_3$ is a radical of the formulae (16a) and (16i) given in the foregoing, or together with the nitrogen atom and at least one of the substituents which are bound to the nitrogen atoms it forms a radical of the formula (17a) given in the foregoing, wherein $R_{16(17)}$ and $R_{18(19)}$ are replaced by $R_{20(21)}$ and $R_{22(23)}$; or of the formula (17b) or (17c).

Also preferred are in particular those polymeric quaternary ammonium salts of which the cationic recurring units correspond to the formula

(20) 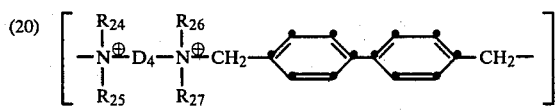

wherein $R_{24}$, $R_{25}$, $R_{26}$ and $R_{27}$ are identical to or different from one another, and are alkyl or hydroxyalkyl having 1 to 4 carbon atoms, alkenyl having 2 to 4 carbon atoms, $CH_3OOCCH_2-$, $C_2H_5OOCCH_2-$ or benzyl; or ($R_{24}$ and $R_{25}$) and/or ($R_{26}$ and $R_{27}$) together with the nitrogen atom to which they are bound form a piperidine or morpholine group; and $D_4$ is $-(CH_2)_{m_1}$, wherein $m_1$ is a number from 1 to 12 inclusive, or a radical of any one of the formulae (21a) $-(CH_2)_2CH-$, (21b) $-CH_2CH=CH\,CH_2-$,
$\quad\quad\quad\quad\;\;|$
$\quad\quad\quad\quad CH_3$ (21c) $-CH_2\underset{\underset{O}{\|}}{C}CH_2-$, (21d) $-CH_2-\underset{\underset{OH}{|}}{CH}-CH_2-$, (21e) $\pm CH-CH_2-O\pm_x CH_2-CH-$, wherein x is at least 1,
$\quad\quad\;|\quad\quad\quad\quad\quad\quad\quad\quad|$
$\quad\quad CH_3\quad\quad\quad\quad\quad\quad\; CH_3$ (21f) 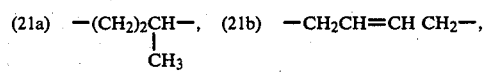, (21g) 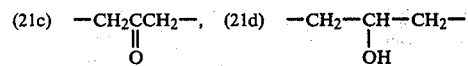, (21h) 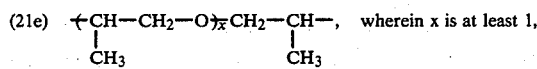, (21i) , (21j) , (21k)  or (21l) 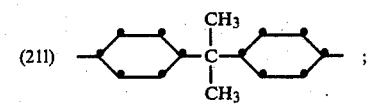 ;

or together with the nitrogen atoms and in each case at least one of the substituents bound to the nitrogen atoms $D_4$ is a radical of the formula (17b) or (17c) given in the foregoing, or it is a radical of the formula (22a) 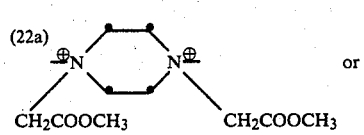 or (22b) 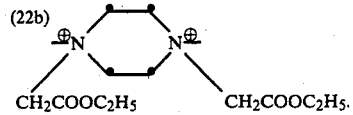

There may be mentioned individually for example polymeric quaternary ammonium salts having cationic recurring units of the following formulae:

(23) 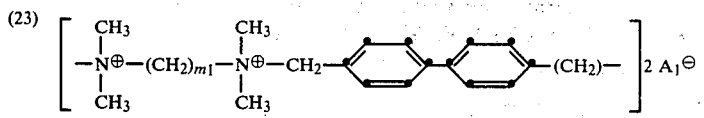

wherein $m_1$ is 1 to 12 inclusive, and $A_1$ is halogen, and

(24) 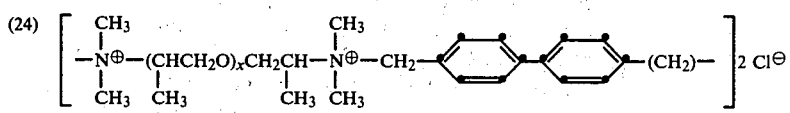

wherein x is at least 1.

These ammonium salts and their production are known, and are described for example in the German Offenlegungsschrift No. 2,657,582. With regard to specific representatives of the recurring units of these polymeric quaternary ammonium salts, reference may be made to the formulae (5) to (7) and (9) to (39) disclosed in the Offenlegungsschrift mentioned, which are all suitable to be used in the process according to the invention.

Of principal interest among these specific representatives is the polymeric quaternary ammonium salt which contains the cationic recurring units of the formula

(25) 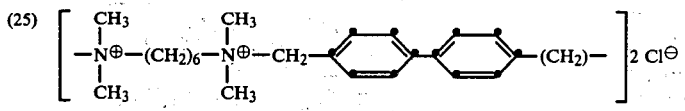

Polymeric quaternary ammonium salts which are suitable as specially preferred levelling agents are salts containing cationic recurring units of the formula

(26) 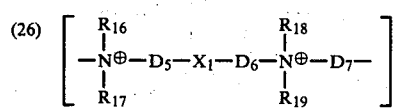

wherein $R_{16}$, $R_{17}$, $R_{18}$ and $R_{19}$ have the meanings defined; $D_5$ and $D_6$ are each $-C_nH_{2n}-$, wherein n is 1 to 12 inclusive; and the sum of the n's in $D_5$ and $D_6$ is at least 3, and for n equals 1 the bond to the bridge member $X_1$ does not occur by way of a nitrogen or oxygen atom; or $D_5$ and $D_6$ are each an aromatic bridge member, and they are identical to or different from one another; $D_7$ is a radical of any one of the formulae

(27) $-C_{m2}H_{2m2}-$, (27a) $-CH_2O-G_1-OCH_2-$,
(27b) $-CH_2(OG_2)_{p1}OCH_2-$ (27c) $-CH_2COCH_2-$,
(27d) $-CH_2CHOHCH_2-$, (27e) 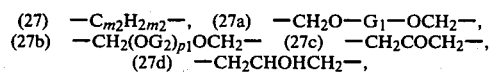 (27f) 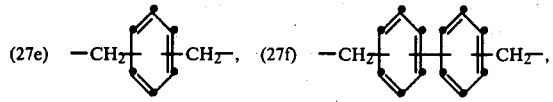

(27g) 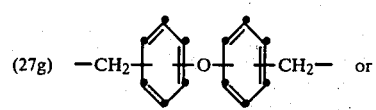 or (27h) 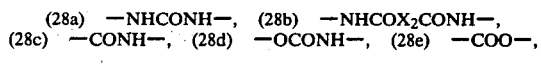

wherein $G_1$ is straight-chain or branched-chain alkylene which has 2 to 12 carbon atoms and which can be substituted by halogen; $G_2$ is ethylene, isopropylene or n-butylene; $m_2$ is 2 to 12 inclusive; and $p_1$ is 2 to 15 inclusive; and $X_1$ is a bivalent bridge member of any one of the formulae (28a) $-NHCONH-$, (28b) $-NHCOX_2CONH-$,
(28c) $-CONH-$, (28d) $-OCONH-$, (28e) $-COO-$, (28f) $-COX_3CO-$, (28g) 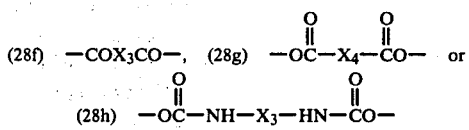 or (28h) $-OC-NH-X_3-HN-CO-$ (with O double bonds on each C)

wherein $X_2$ is the direct bond, alkylene, alkenylene, arylene or heteroarylene, diaminoalkylene, diaminoarylene, optionally halogen-substituted dioxyalkylene, polyoxyalkyleneoxy or dioxyarylene; $X_3$ is diaminoalkylene, optionally halogen-substituted dioxyalkylene, polyoxyalkyleneoxy or optionally halogen-substituted dithioalkylene; $X_4$ is arylene; and $X_5$ is alkylene or arylene.

Particularly suitable polymeric quaternary ammonium salts contain cationic recurring units which correspond to the formula

(29) 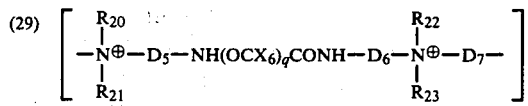

wherein $R_{20}$, $R_{21}$, $R_{22}$ and $R_{23}$ have the meanings defined in the formula (19) given in the foregoing; $X_6$ is $-C_rH_{2r}-$, wherein r is an integer from 1 to 12 inclusive, $-(CH=CH-)_s$, wherein s is 1 or 2, a radical of the formula (16b) given in the foregoing, or a radical of the formula (30a) $-NH(CH_2)_mNH-$, wherein m is 2 to 12 inclusive, or of the formula

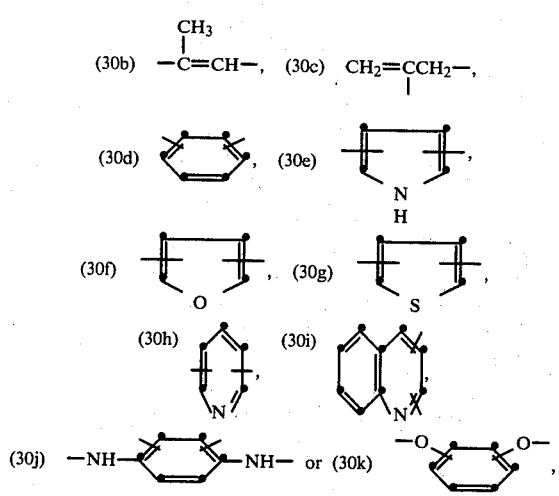

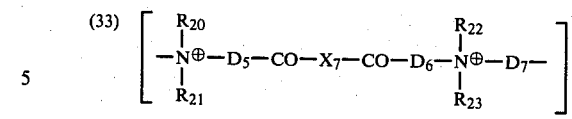

wherein $X_7$ is a radical of the formula (30m) or (30n), or —$S(CH_2)_{m2}S$— or —$NH(CH_2)_{m2}NH$—; and $m_2$, $D_5$, $D_6$, $D_7$, $R_{20}$, $R_{21}$, $R_{22}$ and $R_{23}$ have the given meanings; or cationic recurring units of the formula

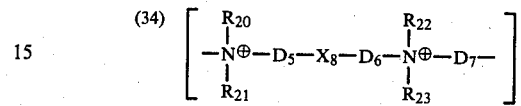

wherein $X_8$ is —CONH—, —OCONH— or —COO—; and $D_5$, $D_6$ and $D_7$ and $R_{20}$, $R_{21}$, $R_{22}$ and $R_{23}$ have the given meanings.

Particularly suitable representatives having recurring units of the formula (34) are those of which the recurring units correspond to the formula wherein the aromatic rings can be substituted by halogen, alkyl and/or alkoxy; also of the formula

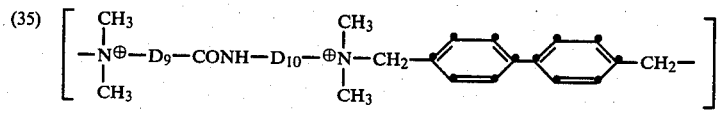

wherein $D_9$ is alkylene having 1 to 4 carbon atoms, or phenylene; and $D_{10}$ is alkylene having 2 to 6 carbon atoms, or phenylene.

A further group of well suited polymeric quaternary ammonium salts contains the cationic recurring units of the formula

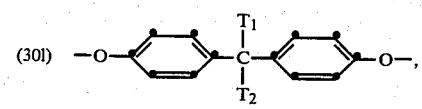

wherein $T_1$ and $T_2$ are each hydrogen or methyl; and of the formula (30m) —$OG_1O$—, or (30n) —$(OG_2)_{p1}O$—, wherein $G_1$, $G_2$, $p_1$ and $D_5$, $D_6$ and $D_7$ have the given meanings, and q is 0 or 1.

Further interesting compounds are those having cationic recurring units of the formula (29), wherein $X_6$ is the direct chemical bond; and q is equal to 1, and the preferred cationic recurring units of the formula

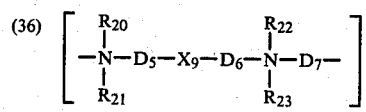

wherein $X_9$ is a radical of the formula

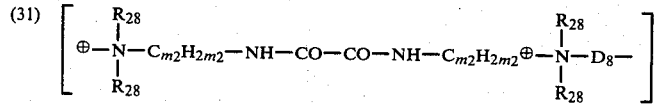

wherein $R_{28}$ is alkyl having 1 to 4 carbon atoms; $D_8$ is —$C_{m3}H_{2m3}$—, or a radical of the formula

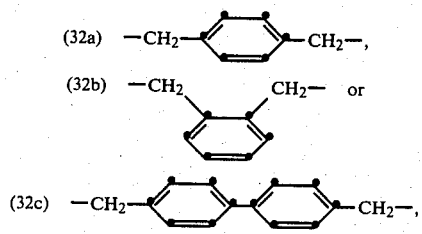

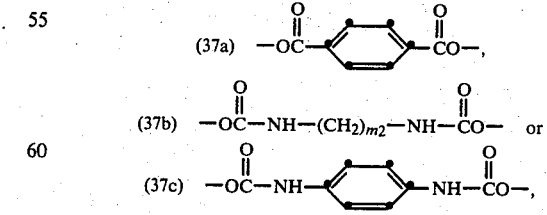

$m_2$ is 2 to 12 inclusive; and $m_3$ is 2 to 6 inclusive.

Preferred also are the polymeric quaternary ammonium salts of which the cationic recurring units correspond to the formula $m_2$ is 2 to 12 inclusive; and $D_5$, $D_6$, $D_7$, $R_{20}$, $R_{21}$, $R_{22}$ and $R_{23}$ have the given meanings.

Most particularly advantageous are moreover the polymeric quaternary ammonium salts of which the cationic recurring units correspond to the formula

(38) 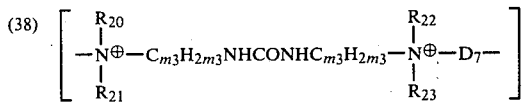

wherein $m_3$, $D_7$, $R_{20}$, $R_{21}$, $R_{22}$ and $R_{23}$ have the given meanings; preferably to the formula

(39) 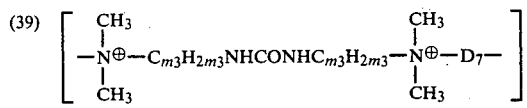

wherein $D_7$ and $m_3$ have the given meanings; and especially to the formula

(40) 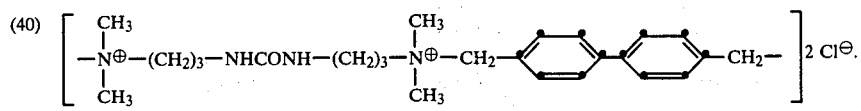

These ammonium salts and the production thereof are known, and are described for example in the German Offenlegungsschrift No. 2,824,743. Concerning specific representatives of the recurring units of these polymeric quaternary ammonium salts, reference may be made to the formulae (101) to (138) disclosed in the Offenlegungsschrift mentioned. The ammonium salts having these recurring units are all suitable for use as levelling agents in the process according to the invention, as is the case with respect to the ammonium salt containing the cationic units of the formula (40).

As anions for the polymeric quaternary ammonium salts containing recurring units of the formulae (15) to (40), there can be used all customary inorganic or organic anions which do not form with the cations any difficultly soluble complexes, since the ammonium salts are preferably to be water-soluble. There may be mentioned for example the anions of mineral acids, or of low-molecular organic acids. Suitable anions are for example the halogen anions such as $J^\ominus$, $Br^\ominus$, and particularly $Cl^\ominus$, methylsulfate ($CH_3SO_4^\ominus$), ethylsulfate ($C_2H_5SO_4^\ominus$), toluenesulfonate, nitrate and sulfate.

These polymeric quaternary ammonium salts in general have molecular weights of 1000 to 100,000, preferably from 2000 to 50,000, and particularly from about 4000 to about 20,000. They are as a rule soluble in water.

The levelling agent as defined is added in the process according to the invention in amounts of 0.01 to 5 percent by weight, especially 0.1 to 0.5 percent by weight, relative to the cellulose-containing fibre material or paper, to the pretreatment bath or dye bath, respectively.

The process can be performed, continuously or preferably as an exhaust process, according to two possible methods:

(a) the cellulose-containing fibre material is introduced into an aqueous liquor containing 0.01–5 percent by weight, particularly 0.1–0.5 percent by weight, of the cationic or basic levelling agent as defined, in addition to at least one dye as defined; the temperature of the dye bath is raised, within for example 30 to 60 minutes, to the boiling point, and the material is dyed for about 30 to 90 minutes; or (b) the material to be dyed is firstly treated with an aqueous liquor containing at least one cationic or basic levelling agent in the given amounts; and to this liquor is then added at least one cationic or basic dye as defined; and the material to be dyed is subsequently dyed. The material to be dyed is pretreated at a temperature of between 10° and 130° C., especially between 20° and 50° C., for 1 to 120 minutes, particularly for 10 to 20 minutes, with the aqueous solution of the cationic or basic levelling agent; and, after the addition of the dye as defined, the bath is heated in the course of 10 to 180 minutes, preferably within 30 to 60 minutes, to 40° to 130° C., especially 80° to 100° C. This process is the preferred embodiment.

In both cases, the dyed cellulose material is subsequently finished in the customary manner, with a simple rinsing being sufficient; a soaping operation is no longer necessary, which is in contrast to hitherto known dyeing processes for cellulose textile materials.

The pH value of the pretreatment bath and/or dye bath is between 3 and 11, advantageously between 4 and 7, particularly around pH 4.

Suitable cellulose-containing fibre materials are in particular those of a textile nature, such as those made from natural cellulose, for example cotton, hemp, linen, jute and ramie; or regenerated cellulose, such as rayon, viscose cellulose or cuprammonium rayon; and these materials can be in any stage of processing, for example as loose material (slubbing), or in the form of filaments, yarns, fabrics or knitted goods.

Furthermore, the process according to the invention can be used also for dyeing paper.

It is possible by the process according to the invention to dye non-tannin-treated textile cellulose materials without an additional salt addition from a dye bath having a low electrolyte content, that is, from a dye bath containing per liter between 0 and about 5 g of electrolyte, originating from the natural salt content of the water and/or from the dye-extender, with no loss in build-up or in the degree of exhaustion of the dyes as defined being ascertainable.

In contrast to processes using conventional direct and after-coppered direct dyes and also reactive, sulfur and vat dyes, which are customarily used for dyeing cellulose material, the process of the invention enables an addition of an electrolyte to be dispensed with. This is a considerable advantage, since usually large amounts, in the case of vat and direct dyes per liter up to 20 g and in the case of some reactive dyes per liter above 100 g, of sodium sulfate or sodium chloride has to be added to the dye bath in order to obtain an economical degree of exhaustion.

The process according to the invention is also suitable in particular for di-, tri- and polychromatic dyeing, for which process at least two, three or more of the dyes as defined are added to the dye bath. The dyeings are distinguished by very good reproducibility of shade. This is an important advantage since the present direct, vat and reactive dyes exhibit a very heterogeneous behaviour in the presence of electrolytes, in consequence of which a reliable reproducible di- or trichromatic dyeing with these anionic dyes is scarcely possible. The possibility of applying the trichromatic principle also to the dyeing of cellulosic textiles or paper constitutes a great advance in the direction of a more rational mode of dyeing.

The cellulose-containing fiber material and paper dyed by the process according to the invention are characterised by a level dyeing in light-coloured to dark shades, by a high degree of exhaustion of the dyes, which in the case of light to medium shades can attain 100%, by excellent fastness to wet processing, which in some cases can equal the fastness to wet processing of a vat or reactive dyeing, and by good reproducibility of shade.

The following Examples further illustrate the invention without the scope of the invention being in any way limited by them. Temperature values are given in degrees Centigrade and, except where otherwise stated, the term 'parts' denotes parts by weight.

EXAMPLE 1

10 parts of cotton fabric (bleached, mercerised cotton) are pretreated at 40° for 15 minutes, in a laboratory beam-dyeing apparatus, in 200 parts of an aqueous liquor (water hardness 10° dH, pH 6, three circulations of the dye liquor per minute) containing as levelling agent 0.02 part of a quaternary polymeric ammonium salt which contains cationic recurring units of the formula (25) and has a mean molecular weight of 12,000. There is subsequently added to the liquor 0.002 part of the dye of the formula

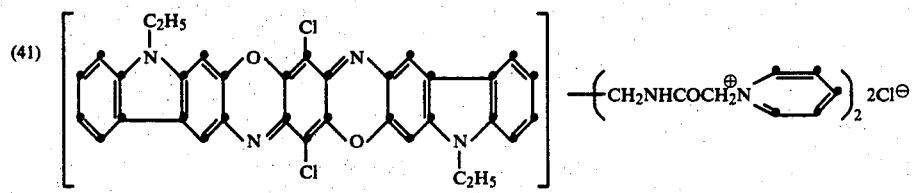

the temperature being held at 40° for 15 minutes. The bath is then heated in 40 minutes to 80°, in the course of which an even build-up of dye on the fibres occurs. At the end of the heating phase, the liquor is practically colourless. The degree of exhaustion is about 99%. The liquor is then cooled, and the fabric is rinsed and dried. The brilliant light-blue dyeing obtained is characterised by good fastness to light, by a perfectly satisfactory levelness, and in particular by an excellent fastness to wet processing which corresponds to the standard of a dyeing obtained with vat dyes or with reactive dyes.

Similar results are obtained by using as levelling agent a quaternary polymeric ammonium salt containing cationic recurring units of the formula (15).

If however the pretreatment with the levelling agent is dispensed with, the dye exhausts completely in less than 5 minutes to give a very unlevel dyeing which is useless for practical purposes.

EXAMPLE 2

10 parts of cotton fabric (bleached, mercerised cotton) are pretreated at 40° for 15 minutes, in a laboratory beam-dyeing apparatus (Pretema Multicolor), in 200 parts of an aqueous liquor (water hardness 8° dH, pH 7) containing as levelling agent 0.02 part of a quaternary polymeric ammonium salt which contains cationic recurring units of the formula (40). There is then added to the liquor 0.005 part of the dye of the formula

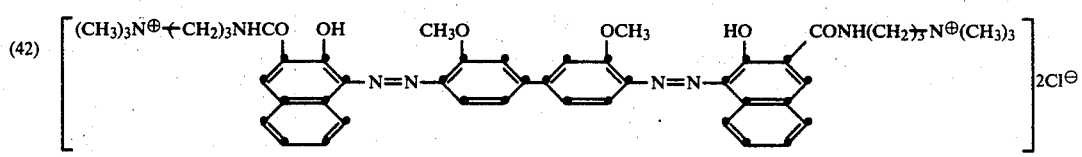

the temperature being held at 40° for 15 minutes. The bath is subsequently heated in 40 minutes to 80°, in the course of which an even build-up of dye is formed. At the end of this heating phase, the liquor is exhausted (degree of exhaustion about 100%). There is obtained, after cooling, rinsing and drying, a reddish light-blue dyeing which is characterised by perfectly satisfactory levelness and an excellent fastness to wet processing.

Similar results are obtained by using as levelling agent a quaternary polymeric ammonium salt containing the cationic recurring units of the formula (26).

If the pretreatment with the levelling agent is however dispensed with, the dyeing obtained is very unlevel and is useless for practical purposes.

EXAMPLE 3

The procedure is carried out as in Example 1 except that 0.03 part (instead of 0.002 part) of the given dye is added to the dye bath. At the end of the heating phase, the dye bath is practically exhausted. The brilliant and deeply coloured, neutral blue dyeing obtained is characterised by very good fastness to light, by a perfectly satisfactory levelness, and in particular by an excellent fastness to wet processing.

EXAMPLE 4

10 parts of cotton fabric (non-mercerised popelin) are pretreated at 40° for 10 minutes, in a laboratory beam-dyeing apparatus, in 250 parts of an aqueous liquor (water hardness 8° dH, pH 7.5) containing as levelling agent 0.02 part of a quaternary polymeric ammonium salt which contains cationic recurring units of the formula (40). There is then added to the liquor 0.1 part of the dye of the formula

(43) 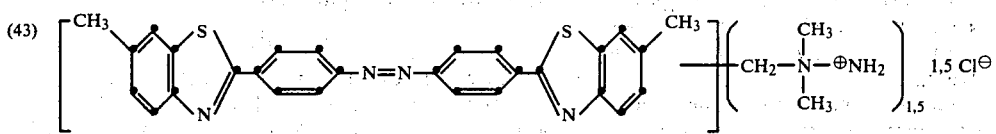

and the temperature is maintained for 5 minutes at 40°. The bath is subsequently heated within 30 minutes to 100°, and dyeing is performed at 100° for a further 30 minutes, in the course of which an even build-up of dye on the fibres occurs. The degree of exhaustion is over 95%. The liquor is cooled, and the fabric is rinsed and dried. The deeply coloured yellow shade is characterised by very good fastness to light, by perfectly satisfactory levelness, and by very good fastness to wet processing.

EXAMPLE 5

10 parts of cotton fabric (mercerised, bleached) are treated as described in Example 4. The 0.1 part of the given dye is however replaced by 0.03 part of the dye of the formula

(45) 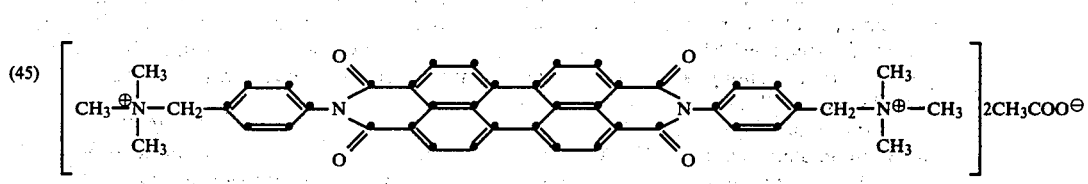

(43a) 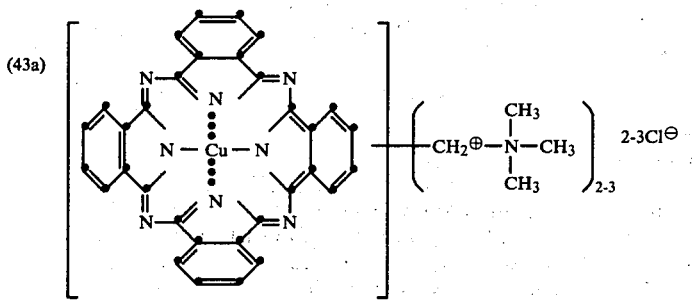

The degree of exhaustion is about 98%. The fibres are dyed in a medium torquoise shade. The dyeing is level, fast to light, and has excellent fastness to wet processing.

EXAMPLE 6

10 parts of cotton (mercerised, bleached) are treated as in Example 4. There is used however, instead of 0.1 part of the given dye, 0.1 part of the dye of the formula

(44) 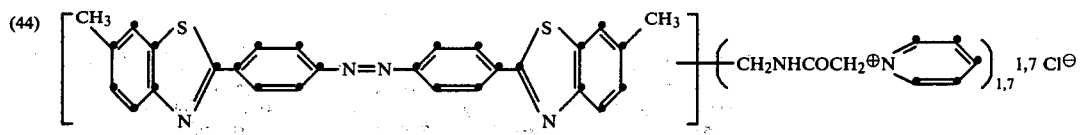

The dye bath is exhausted to the extent of over 90%. The resulting brilliant, deep coloured yellow dyeing is distinguished by very good fastness to light, by perfectly satisfactory levelness, and particularly by excellent fastness to wet processing (vat or reactive dye standard)

EXAMPLE 7

The procedure is carried out as in Example 4 except that there is added to the dye bath, instead of 0.1 part of the given dye, 0.05 part of the dye of the formula At the end of the heating phase, the dye bath is fully exhausted. The medium red shade obtained is level, fast to light, and has excellent fastness to wet processing.

If there are used equimolar parts of the respective dyes listed in the following Table instead of 0.1 part of the given dye according to Example 4, the procedure otherwise being the same, there are likewise obtained level dyeings, the shades of which on cotton are given in the right-hand column of the Table.

| Ex. No | Dye (formula No.) | Shade on cotton |
|---|---|---|
| 8 | (46) | red |
| 9 | (47) | yellow |
| 10 | (48) | yellow |
| 11 | (49) | red-violet |
| 12 | (50) | yellow |
| 13 | (51) | turquoise |

EXAMPLE 14

10 parts of cotton fabric (mercerised, bleached) are treated at 40° for 15 minutes, in a laboratory beam-dyeing apparatus, in 200 parts of a liquor (water hardness 9° dH, pH 6, three circulations of the dye liquor per minute) containing as levelling agent 0.02 part of a quaternary polymeric ammonium salt which contains cationic recurring units of the formula (25) and which has an average molecular weight of 12,000. There is subsequently added to the liquor 0.002 part of the dye of the formula (41) and 0.002 part of the dye of the formula and the whole is allowed to react for 20 minutes at 50°. There is subsequently added to the liquor 0.001 part of the dye used in Example 1, and the liquor is heated within 30 minutes to 100°, and is held at this temperature for a further 30 minutes. The liquor is then cooled,

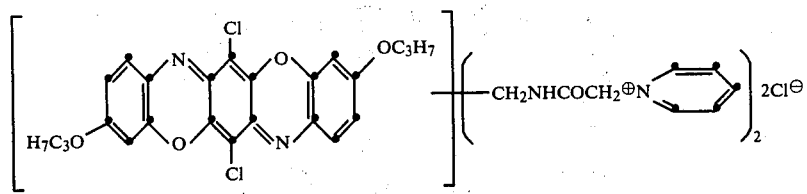

the temperature being held for 15 minutes at 40°. The bath is then heated in 40 minutes to 80°, in the course of which an even build-up of the two dyes on the fibres occurs. The two dyes exhaust tone-in-tone, and the degree of exhaustion of the two dyes is at least 99% at the end of the heating phase. The liquor is then cooled, and the fabric is rinsed and dried. The pale pink dyeing obtained is characterised by good fastness to light, by perfectly satisfactory levelness, and particularly by excellent fastness to wet processing.

The dyeing was repeated with the various water hardnesses and pH values such as occur in natural water (water hardness-range 0–20 dH, pH range 5–8). It was not possible to detect any noticeable differences in shade.

EXAMPLE 15

The procedure is carried out as in Example 14 except however that 0.02 part of the dye of the formula (44) and 0.01 part of the dye of the formula (42) are used. The heating phase (40°–80°) is 60 minutes. An even tone-in-tone build-up of the two dyes occurs. The dye liquor is practically completely exhausted. The green shade obtained is characterised by a perfectly satisfactory quality and excellent fastness to wet processing.

EXAMPLE 16

10 parts of mercerised bleached cotton are wetted at 50° for 30 minutes, in a winch vat, in 200 parts of an aqueous liquor (water hardness about 10° dH, pH 5) containing 0.2 part of a commercial nonionic wetting agent (ethoxylated nonylphenol) and 0.02 part of a commercial (partially anionic) antifoaming and de-aerating agent (Albegal FFD). There are then added to the same liquor 0.05 part of the cationic polymer of the formula and the material is rinsed and dried. The degree of exhaustion is over 95% (without an electrolyte such as $Na_2SO_4$ having to be added). The brilliant light-blue dyeing obtained is characterised by a good levelness, by good fastness to light and to excellent fastness to wet processing.

What is claimed is:

1. A process for dyeing cellulosic fibers comprising the step of applying an aqueous dye liquor to the fibers in the presence of a cationic levelling agent and in the substantial absence of other electrolytes, wherein the aqueous dye liquor contains a cationic dye which is a planar molecule having at least one system of delocalized $\pi$-electrons of at least 9 conjugated doubled bonds.

2. A process according to claim 1, wherein the cationic dye is one containing at least 12 uninterruptedly conjugated double bonds lying in one plane.

3. A process according to claim 1 or 2, wherein the cationic dye contains 1 to 8 cationic groups.

4. A process according to claim 3, wherein the cationic dye contains 1 to 3 cationic groups.

5. A process according to claim 1, wherein the employed dye is a dye of the formula

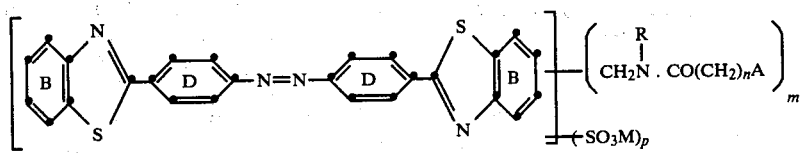

wherein R is hydrogen or an alkyl group having 1 to 4 C atoms; A is an optionally quaternised basic radical; n denotes the numbers 1 to 4 inclusive; m denotes the numbers from 1 to 4 inclusive; M is hydrogen or any chosen cation; and p denotes the numbers 0 to 2 inclusive, with the proviso that m is equally great as or greater than p, and wherein the benzene groups B and D can be identically or differently further mono- or polysubstituted.

6. A process according to claim 1, wherein the employed dye is a dye of the formula

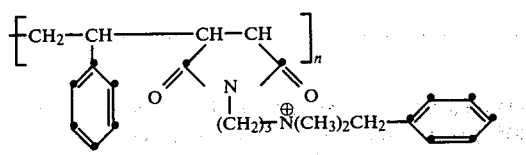

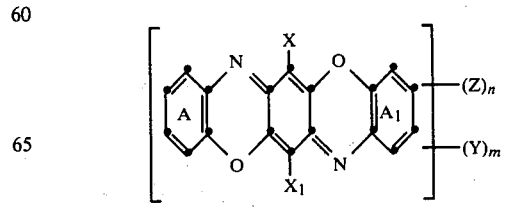

wherein Z is an optionally quaternised basic group; Y is an anionic group; X and $X_1$ independently of one another are identical or different substituents from the class: hydrogen, halogen, CN, substituted or unsubstituted alkyl ($C_1$-$C_4$), substituted or unsubstituted phenyl, or $NHCOR_1$, wherein $R_1$ is alkyl ($C_1$-$C_4$), cycloalkyl, substituted or unsubstituted aryl, or a heterocyclic radical, or $OCOR_2$, wherein $R_2$ is substituted or unsubstituted alkyl ($C_1$-$C_4$) or cycloalkyl, or

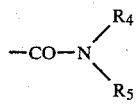

wherein $R_4$ and $R_5$ independently of one another are: hydrogen, substituted or unsubstituted alkyl ($C_1$-$C_4$), cycloalkyl or aryl, or $R_4$ together with $R_5$ and including the N atom forms a heterocyclic ring, or X and $X_1$ are the group $COOR_6$, wherein $R_6$ is hydrogen, substituted or unsubstituted alkyl or cycloalkyl; n denotes the numbers from 1 to 4 inclusive; m denotes the numbers 0 to 2 inclusive, with the proviso that the number m is smaller than n; and wherein the benzene groups A and $A_1$ can be identically or differently further mono- or polysubstituted.

7. A process according to claim 1, wherein the employed dye is a dye of the formula

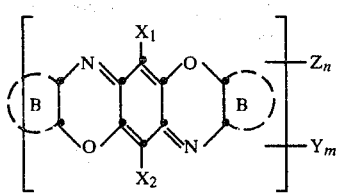

wherein $X_1$ and $X_2$ independently of one another are each a straight-chain or branched-chain alkyl group having 1 to 4 carbon atoms, a substituted or unsubstituted phenyl group, halogen, hydrogen, cyano, a phenylamino group which can be substituted in the phenyl group, or they are each the $CONH_2$ group, the CONH phenyl group which can be substituted in the phenyl group, or they are each a COO-alkyl($C_1$-$C_4$) group; Z is an optionally quaternised basic group; Y is an anionic group; and B's independently of one another are each a fused-on ring system having 2 to 4 carbocyclic and/or heterocyclic rings, which system can be further substituted, in addition to the substituents Z and Y; n denotes the numbers from 1 to 4 inclusive, and m the numbers from 0 to 2 inclusive, with the proviso that m is not greater than n.

8. A process according to any one of claims 1 inclusive, wherein the cationic levelling agent used is a polymeric compound.

9. A process according to claim 8, wherein the polymeric cationic levelling agent contains amine, ammonium, sulfonium or phosphonium groups.

10. A process according to claim 9, wherein the polymeric cationic levelling agent contains ammonium groups.

11. A process according to claim 10, wherein the polymeric levelling agent containing ammonium groups contains a copolymer from maleic anhydride and ethylene or styrene, which is reacted with an n-alkylamine having 2 or 3 carbon atoms, which is substituted in the terminal position on the alkyl group by alkylamino having 1 to 4 carbon atoms, or by a cyclic amine which contains 5 or 6 ring carbon atoms and optionally 1 oxygen atom; or it contains a homopolymer of a vinylpyridine which is unsubstituted or substituted by methyl or ethyl; the homo- or copolymer being quaternised with a halomethylnaphthalene or -diphenyl, with chloroacetamide or chloroacetonitrile, or with a benzyl halide which is unsubstituted or substituted by halogen, methyl or ethyl, and optionally with an alkyl or alkenyl halide having at most 4 carbon atoms.

12. A process according to claim 11, wherein the levelling agent contains cationic recurring units which correspond to one of the formulae

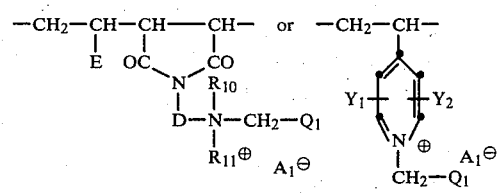

wherein $Q_1$ is a substituent of one of the formulae

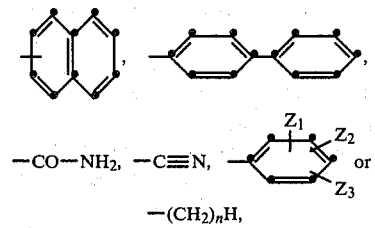

wherein n is 5-19 inclusive, or $Q_1$ is a mixture of at least one substituent of any one of the given formulae with alkyl or alkenyl having at most 4 carbon atoms; and D is ethylene or n-propylene; E is hydrogen, methyl or phenyl; $R_{10}$ and $R_{11}$ are each methyl, ethyl, n-propyl or n-butyl, or together with the nitrogen atom to which they are bound they form a pyrrolidine, piperidine or morpholine group; $A_1$ is halogen; $Y_1$ and $Y_2$ are each hydrogen, methyl or ethyl; and $Z_1$, $Z_2$ and $Z_3$ are each hydrogen, halogen, methyl or ethyl.

13. A process according to claim 12, wherein the levelling agent contains cationic recurring units of the formula

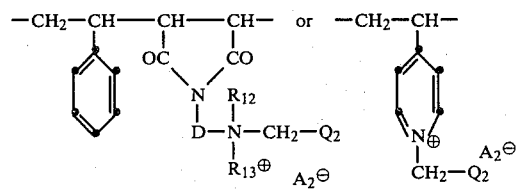

wherein $Q_2$ is $-CN$, $-CH_2-CO-NH_2$ or phenyl; D is ethylene or n-propylene; $A_2$ is chlorine or bromine; $R_{12}$ and $R_{13}$ are each methyl, ethyl or n-propyl, or together with the nitrogen atom to which they are bound they form a morpholine group.

14. A process according to claim 13, wherein the levelling agent contains cationic recurring units of the formula

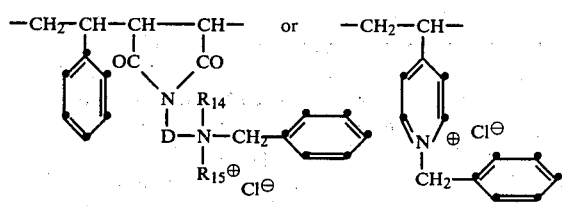

wherein D is ethylene or n-propylene; and $R_{14}$ and $R_{15}$ are each methyl or ethyl.

15. A process according to any one of claims 11 to 14 inclusive, wherein the levelling agent has a mean molecular weight of 1,500 to 1,000,000.

16. A process according to claim 10, wherein the polymeric levelling agent containing ammonium groups is a quaternary ammonium salt which contains cationic recurring units of the formula

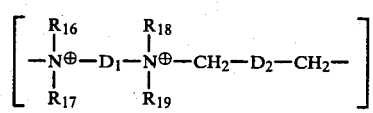

wherein $R_{16}$, $R_{17}$, $R_{18}$ and $R_{19}$ are identical to or different from one another, and are each substituted or unsubstituted alkyl, cycloalkyl or alkenyl having at most 20 carbon atoms, aryl or aralkyl; or ($R_{16}$ and $R_{17}$) and/or ($R_{18}$ and $R_{19}$) together with the nitrogen atom to which they can bound form a substituted or unsubstituted heterocyclic ring having 5 or 6 ring members; D is $-(CH_2)_m-$, wherein m is a number from 1 to 20 inclusive, which groups can be interrupted by at least one $-S-$,

or substituted by at least one hydroxyl, halogen, nitrile, alkyl, hydroxyalkyl, alkoxy, carboxyl or carbalkoxy group, or can be substituted by at least one substituted aryl or aralkyl group; or $D_1$ is polyoxyalkylene; or a radical of any one of the formulae

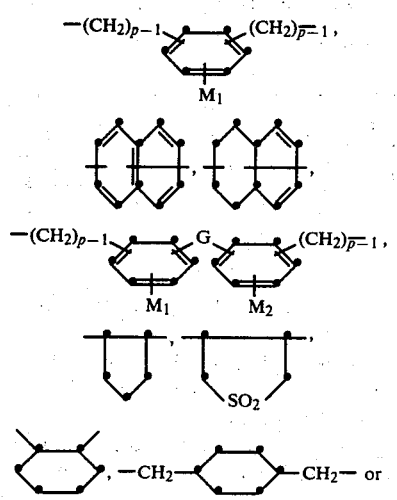

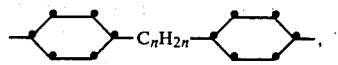

or together with the nitrogen atom and at least one of the substituents bound to the nitrogen atoms it forms a radical of the formula

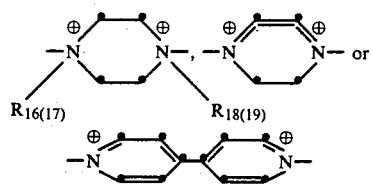

in which formulae $M_1$ and $M_2$ are each hydrogen, alkyl, hydroxy- or haloalkyl having 1 to 4 carbon atoms, hydroxyl, halogen, carboxyl, carbalkoxy or phenyl; G is the direct bond,

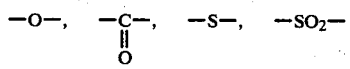

or substituted or unsubstituted alkylene; n is a number from 1 to 6 inclusive; p is a number from 1 to 3 inclusive, preferably 1 or 2; and $D_2$ is a radical of the formula

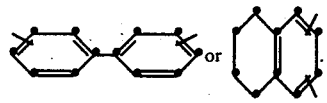

17. A process according to claim 16, wherein the levelling agent contains cationic recurring units of the formula

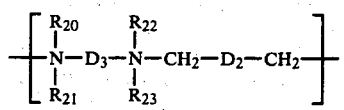

wherein $R_{20}$, $R_{21}$, $R_{22}$ and $R_{23}$ are identical to or different from one another, and are cycloalkyl having 5 or 6 carbon atoms; alkyl, hydroxyalkyl, cyanoalkyl, alkoxyalkyl, alkylthioalkyl and alkylcarbonylalkyl having 1 to 10 carbon atoms; arylcarbonylalkyl, alkylsulfonylalkyl and arylsulfonylalkyl having 1 to 4 carbon atoms in each alkyl part; carboxyalkyl having 1 to 4 carbon atoms in the alkyl part; carbalkoxyalkyl and di-(carbalkoxy)-alkyl having 1 to 4 carbon atoms in each alkoxy and alkyl part; carboxylic acid amidoalkyl which has 1 to 10 carbon atoms in the alkyl part and which can be N-substituted with lower alkyl or aryl; or they are phenyl or benzyl which can be substituted by hydroxyl, cyano, halogen and carboxyl, or by alkyl, hydroxyalkyl, cyanoalkyl, alkoxy and alkylthio having 1 to 4 carbon atoms; alkoxyalkyl, carbalkoxyalkyl and di-(carbalkoxy)alkyl having in each alkyl and alkoxy part 1 to 4 carbon atoms; or ($R_{20}$ and $R_{21}$) and/or ($R_{22}$ and $R_{23}$) together with the nitrogen atom to which they are bound for a substituted or unsubstituted heterocyclic ring having 5 or 6 ring members; $D_3$ is $-(CH_2)_m-$, wherein m is a number from 1 to 20 inclusive, which groups can be interrupted by at least one

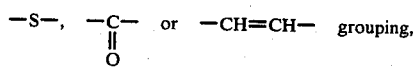 grouping, or can be substituted by at least one hydroxyl, chlorine, nitrile or alkyl, alkoxy or hydroxyalkyl having 1 to 4 carbon atoms, carboxyl or carbalkoxy having 1 to 20, preferably 1 to 4, carbon atoms in the alkoxy part, or substituted or unsubstituted phenyl or benzyl groups; or $D_3$ is a radical of any one of the formulae

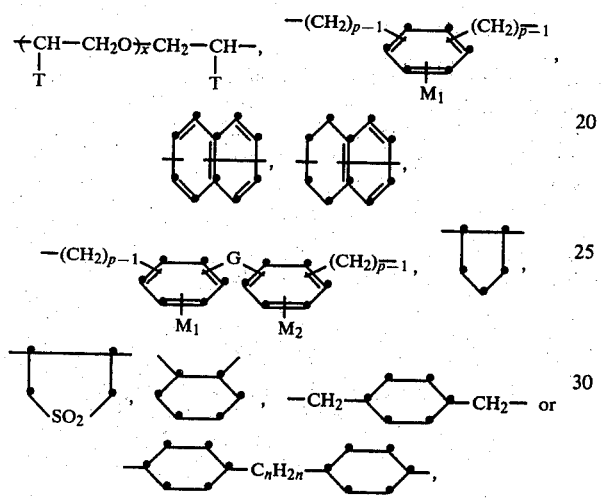

or together with the nitrogen atoms and in each case at least one of the substituents bound to the nitrogen atoms $D_3$ is a radical of the formula

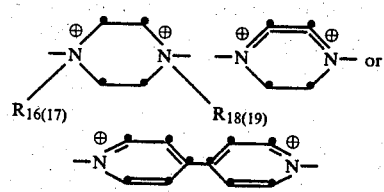

in which formulae

T is hydrogen or methyl; and x is at least 1; and $D_2$, $M_1$ and $M_2$ and G have the meanings given in claim 16.

18. A process according to claim 17, wherein the levelling agent contains cationic recurring units of the formula

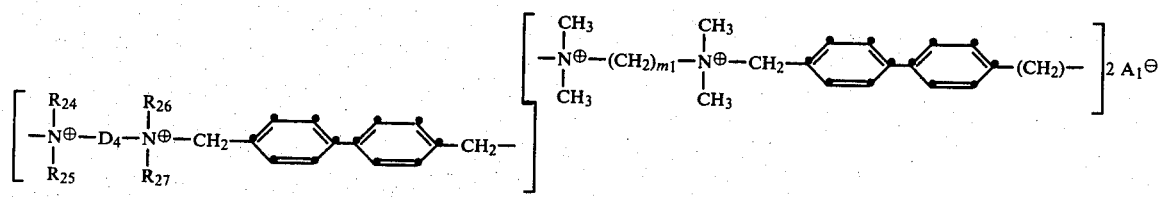

wherein $R_{24}$, $R_{25}$, $R_{26}$ and $R_{27}$ are identical to or different from one another, and are alkyl or hydroxyalkyl having 1 to 4 carbon atoms, alkenyl having 2 to 4 carbon atoms, $CH_3OOCCH_2-$, $C_2H_5OOCCH_2-$ or benzyl; or ($R_{24}$ and $R_{25}$) and/or ($R_{26}$ and $R_{27}$) together with the nitrogen atom to which they are bound form a piperidine or morpholine group; and $D_4$ is $-(CH_2)_{m_1}$, wherein $m_1$ is a number from 1 to 12 inclusive, or a radical of any one of the formulae

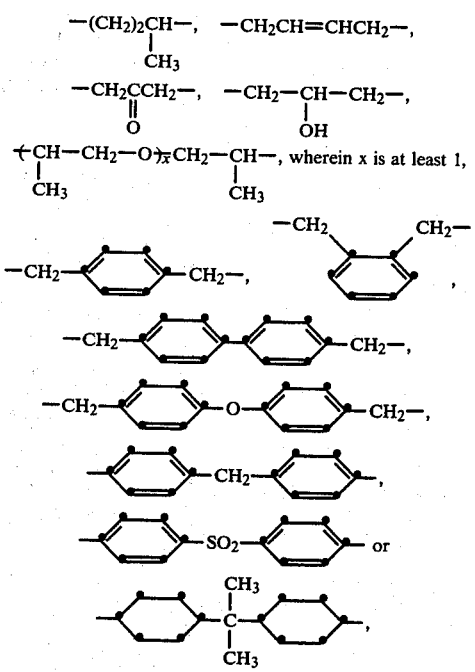

or together with the nitrogen atoms and in each case at least one of the substituents bound to the nitrogen atoms $D_4$ is a radical of the formula

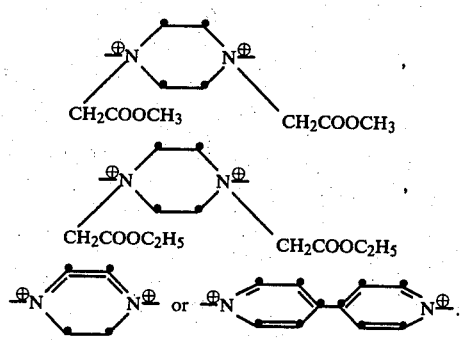

19. A process according to claim 18, wherein the levelling agent contains cationic recurring units of the formula

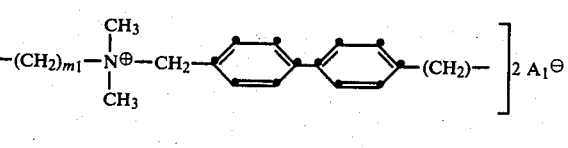

wherein $m_1$ is 1 to 12 inclusive; and $A_1$ is halogen.

20. A process according to claim 18, wherein the levelling agent contains cationic recurring units of the formula

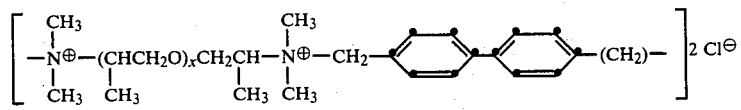

wherein x is at least 1.

21. A process according to claim 10, wherein the polymeric levelling agent containing ammonium groups is a quaternary ammonium salt containing cationic recurring units of the formula

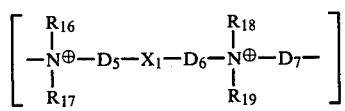

wherein $R_{16}$, $R_{17}$, $R_{18}$ and $R_{19}$ have the meanings given in claim 13; $D_5$ and $D_6$ are each $-C_nH_{2n}-$, wherein n is 1 to 12 inclusive; and the sum of the n's in $D_5$ and $D_6$ is at least 3, and for n equals 1 the bond to the bridge member $X_1$ does not occur by way of a nitrogen or oxygen atom; or $D_5$ and $D_6$ are an aromatic bridge member, and they are identical to or different from one another; $D_7$ is a radical of the formula $-C_{m2}H_{2m2}-$, $-CH_2(OG_2)_{p1}OCH_2-$, $-CH_2COCH_2-$, $-CH_2CHOHCH_2-$, $-CH_2O-G_1-OCH_2$

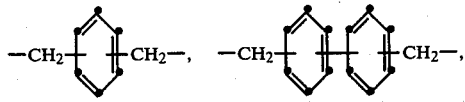

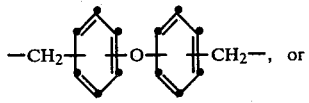

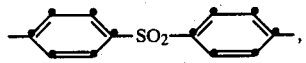

wherein $G_1$ is straight-chain or branched-chain alkylene which has 2 to 12 carbon atoms and which can be substituted by halogen; $G_2$ is ethylene, isopropylene or n-butylene; $m_2$ is 2 to 12 inclusive; and $p_1$ is 2 to 15 inclusive; and $X_1$ is a bivalent bridge member of the formula $-NHCONH-$, $-NHCOX_2CONH-$, $-CONH-$, $-OCONH-$, $-COO-$, $-COX_3CO-$, $-\overset{O}{\underset{\|}{O}C}-X_4-\overset{O}{\underset{\|}{C}O}-$ or $-\overset{O}{\underset{\|}{O}C}-NH-X_5-HN-\overset{O}{\underset{\|}{C}O}-$, wherein $X_2$ is the direct bond, alkylene, alkenylene, arylene or heteroarylene, diaminoalkylene, diaminoarylene, optionally halogen-substituted dioxyalkylene, polyoxyalkyleneoxy or dioxyarylene; $X_3$ is a diaminoalkylene, optionally halogen-substituted dioxyalkylene, polyoxyalkyleneoxy or optionally halogen-substituted dithioalkylene; $X_4$ is arylene; and $X_5$ is alkylene or arylene.

22. A process according to claim 21, wherein the levelling agent contains cationic recurring units of the formula

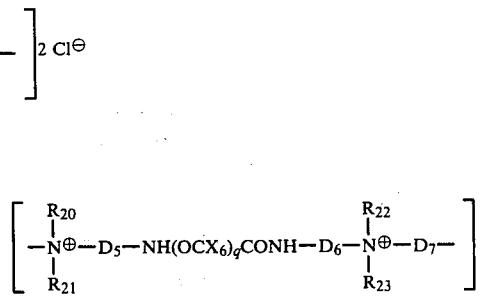

wherein $R_{20}$, $R_{21}$, $R_{22}$ and $R_{23}$ have the meanings given in claim 14; $X_6$ is $-C_rH_{2r}-$, wherein r is an integer from 1 to 12 inclusive, $-(CH=CH-)_s$, wherein s is 1 or 2, a radical of the formula $-NH(CH_2)_mNH-$, wherein m is 2 to 12 inclusive,

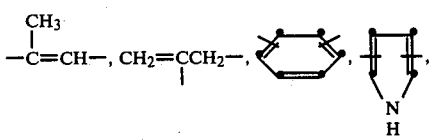

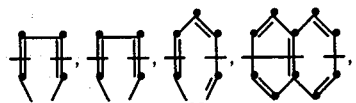

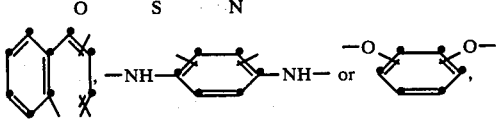

wherein the aromatic rings can be substituted by halogen, alkyl and/or alkoxy; also of the formula

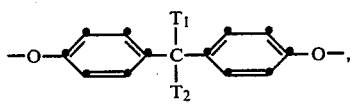

wherein $T_1$ and $T_2$ are each hydrogen or methyl; and of the formula $-OG_1O-$ or $-(OG_2)_{p1}O-$, wherein $G_1$, $G_2$, $p_1$ and $D_5$, $D_6$ and $D_7$ have the meanings given in claim 21; and q is 0 or 1.

23. A process according to claim 19, wherein the levelling agent contains cationic recurring units of the formula

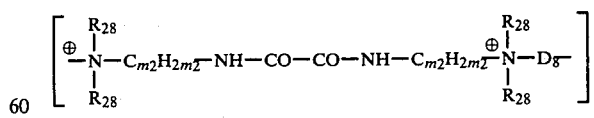

wherein $R_{28}$ is alkyl having 1 to 4 carbon atoms; $D_8$ is $-C_{m3}H_{2m3}-$,

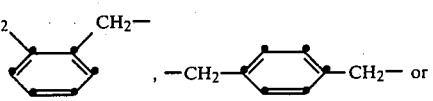

-continued

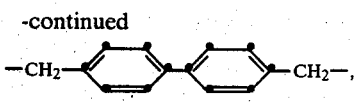

$m_2$ is 2 to 12 inclusive; and $m_3$ is 2 to 6 inclusive.

24. A process according to claim 21, wherein the levelling agent contains cationic recurring units of the formula

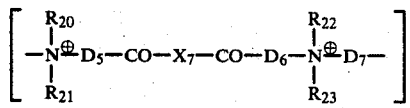

wherein $X_7$ is $-OG_1O-$, $-(OG_2)_{p_1}O-$, $-S(CH_2)_{m_2}S-$ or $-NH(CH_2)_{m_2}NH-$; and $G_1$, $G_2$, $m_2$, $p_1$, $D_5$, $D_6$, $D_7$, $R_{20}$, $R_{21}$, $R_{22}$ and $R_{23}$ have the meanings given in claims 17 and 21.

25. A process according to claim 21, wherein the levelling agent contains cationic recurring units of the formula

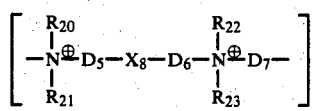

wherein $X_8$ is $-CONH-$, $-OCONH-$ or $-COO-$, and $D_5$, $D_6$, $D_7$ and $R_{20}$, $R_{21}$, $R_{22}$ and $R_{23}$ have the meanings given in claims 17 and 21.

26. A process according to claim 25, wherein the levelling agent contains cationic recurring units of the formula

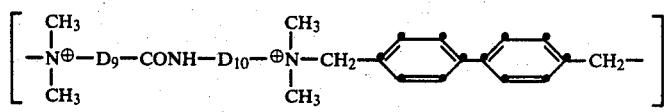

wherein $D_9$ is alkylene having 1 to 4 carbon atoms, or phenylene; and $D_{10}$ is alkylene having 2 to 6 carbon atoms, or phenylene.

27. A process according to claim 21, wherein the levelling agent contains cationic recurring units of the formula

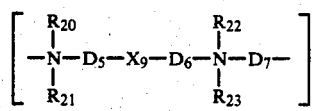

wherein $X_9$ is a radical of the formula

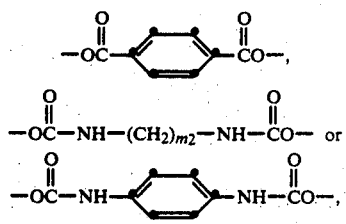

and $m_2$, $D_5$, $D_6$, $D_7$, $R_{20}$, $R_{21}$, $R_{22}$ and $R_{23}$ have the meanings given in claims 17 and 21.

28. A process according to claim 21, wherein the levelling agent contains cationic recurring units of the formula

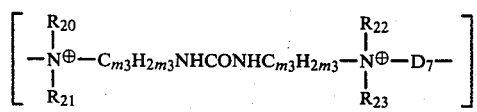

wherein $m_3$ is 2 to 6 inclusive; and $D_7$, $R_{20}$, $R_{21}$, $R_{22}$ and $R_{23}$ have the meanings given in claims 17 and 21.

29. A process according to claim 28, wherein the levelling agent contains cationic recurring units of the formula

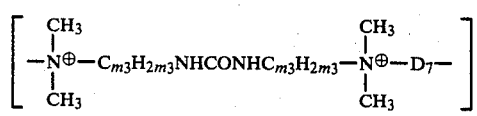

wherein $D_7$ and $m_3$ have the meanings given in claims 18 and 20.

30. A process according to claim 1, wherein the levelling agent has a mean molecular weight of 1,000 to 100,000.

31. A process according to claim 1, wherein the cationic levelling agent is used in amounts of 0.01–5 percent by weight, relative to the cellulose material.

32. A process according to claim 31, wherein the cationic levelling agent is used in amounts of 0.1–0.5 percent by weight, relative to the cellulose material.

33. A process according to claim 1, wherein the aqueous dye liquor contains at least 2 cationic or basic dyes.

34. A process according to claim 1, wherein the aqueous dye liquor contains at least 3 cationic dyes.

35. A process according to claim 1, wherein the cellulose-containing fibre material is pretreated with an aqueous liquor containing at least one cationic levelling agent.

36. A process according to claim 35, wherein the celulose-containing fibre material is pretreated at a temperature of 10° C. to 130° C.

37. A process according to claim 36, wherein the cellulose-containing fibre material is pretreated at a temperature of 20° C. to 50° C.

38. A process according to claim 1, wherein the pH value of the pretreatment liquor and/or dye liquor is between 3 and 11 inclusive.

39. A process according to claim 38, wherein the pH value of the pretreatment liquor and/or dye liquor is between 4 and 7 inclusive.

40. A process according to claim 1, wherein the cellulose material is treated in the exhaust process.

41. A process according to claim 1, wherein textile cellulose material or paper is treated.

42. A process according to claim 41, wherein cotton, viscose, linen or rayon is treated.

43. A dye liquor for performing the process according to claim 1, which dye liquor comprises at least one cationic dye which (a) has available at least one system of delocalised $\pi$-electrons, which system consists of at least 9 conjugated double bonds lying in one plane, and (b) possesses a planar molecular structure, as well as at least one cationic levelling agent.

44. The cellulose-containing fibre material dyed by the process according to claim 1.

* * * * *